(No Model.)

E. H. EVERETT & A. SAMUELSON.
GLASS MELTING FURNACE.

No. 521,537. Patented June 19, 1894.

Section on OO.

Section on SS.

Section on PP.

Section on RR.

Witnesses:
Raphael Netter
Edwin Hopkinson

Edward H. Everett
& Alexander Samuelson
Inventors by Kerr Curtis
Attorneys

United States Patent Office.

EDWARD H. EVERETT AND ALEXANDER SAMUELSON, OF NEWARK, OHIO.

GLASS-MELTING FURNACE.

SPECIFICATION forming part of Letters Patent No. 521,537, dated June 19, 1894.

Application filed March 6, 1893. Serial No. 464,763. (No model.)

*To all whom it may concern:*

Be it known that we, EDWARD H. EVERETT and ALEXANDER SAMUELSON, citizens of the United States, residing at Newark, in the county of Licking and State of Ohio, have invented a new and useful Improvement in Glass-Melting Furnaces, of which the following is a specification.

Our improvement relates to continuous glass melting furnaces, and has special reference to the construction of the bridge wall which separates the melting chamber from the working out chamber. In such furnaces, when constructed with solid or stationary, as distinguished from floating, bridges, difficulty has been experienced in preserving the bridge wall, because the molten glass or metal, being of greater specific gravity than the material forming the bridge wall, had a tendency to raise or float said wall, and thus destroy it. This danger was increased, owing to the fact that the bridge wall was injuriously affected by the expansion and contraction of the other parts of the furnace structure, which, as the temperatures of the melting and gathering chambers were different, had a tendency to disrupt the bridge wall and loosen its blocks so that they were more liable to be floated by the metal. Another difficulty has been that prior bridge walls have been inadequately cooled, and were not therefore able to resist the action of the heat and molten glass and fluxes and so were subjected to rapid disintegration. These difficulties are either entirely overcome or largely obviated by our improvement.

To enable others skilled in the art to make and use our invention, we will now describe it by reference to the accompanying drawings, in which—

Figure 1:
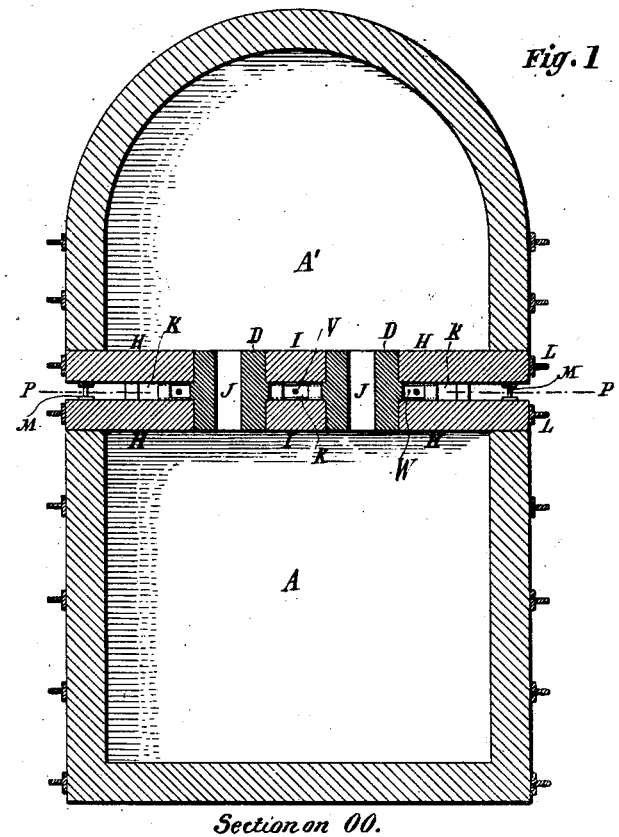
Figure 3:
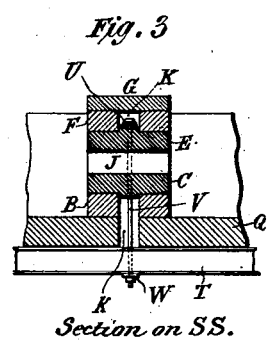
Figure 2:
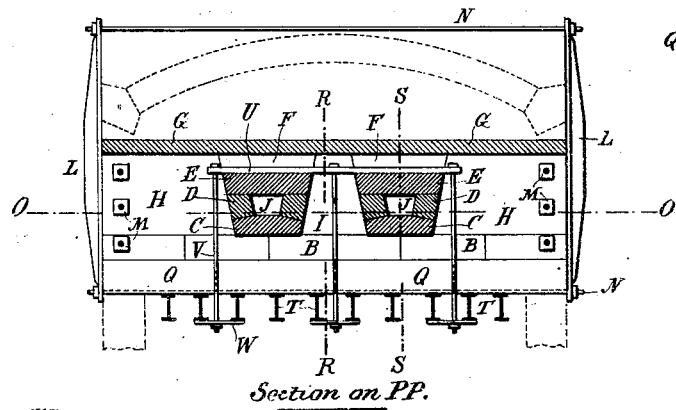
Figure 4:
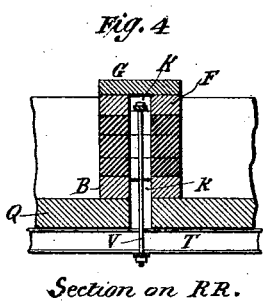

Figure 1 is a horizontal section of the tank of the furnace on the line O—O of Fig. 2. Fig. 2 is a vertical section through the middle of the bridge on the line P—P of Fig. 1. Figs. 3 and 4 are vertical cross sections of the bridge on the lines S—S and R—R of Fig. 2.

Like letters of reference indicate like parts in each.

It will be understood that this furnace belongs to the class of continuous glass melting furnaces known as tank furnaces, which are provided with regenerators for heating the air and gas, suitable ports admitting the air and gas to the bed or tank of the furnace, and a cave extending under the bottom of the furnace for cooling the bottom blocks.

As our improvement relates to the bridge, we have therefore shown only the tank in the drawings; the omitted parts being well understood by the skilled furnace builder.

The bridge in our improved furnace is formed of two walls, each composed of blocks H H, I, F and B, or other suitable blocks, and these walls are severally or independently supported on the separate unconnected hearths or bottoms of the melting chamber A and the working-out chamber A', and form the adjacent sides of said chambers. Between these two walls is a vertical open space or narrow air chamber K which extends entirely across the tank and at the top is covered with cap-stones G. Extending through the bridge and between the chambers A and A', are two passages J J, which, as shown in the drawings, are constructed of bottom blocks C, side blocks D and top blocks E; such blocks being formed so that the external sides of the passages flare outward in an upward direction, forming a wedge-shaped cross-section, and the blocks H H and I between which they extend, are constructed with counterpart or reversely tapered adjacent edges as shown. Extending across the top of the passageways J J, inside of the cavity K, is a rod or plate U, which rests on the top blocks E, and extending downward at the sides of the passages J J and between them, are tie-rods V which at the lower ends are threaded and secured by suitable nuts to the anchor plates W bearing against the under surfaces of the bottom beams T of the furnace. In this way the passageways J J as well as the entire bridge are tied down firmly and securely in place, and as the passageways are the only parts under which the metal secures a bearing, all danger of the bridge wall being floated by the metal is obviated. The chamber K between the walls of the bridge permits the cold air from the cave to circulate freely through the entire structure of the bridge and around the passageways J J, and by keeping it cool, enables it to resist the action of the hot glass and thereby renders it very durable. The air passes from the bridge out at the sides under the edges of the cap-stones G. If desired, the circulation of air through the space K may be facilitated by the application of a blast, as will be readily understood. The bridge walls are not tied to the tank walls and are provided with independent buck-staves L and tie-rods N not connected with the other parts of the furnace, so that the integrity of the structure of the bridge may be preserved entirely independent of the structure of the melting chamber A and working out chamber A', and the bridge is therefore not subject to the injurious effects of different degrees of heat in the melting and working out chambers.

While we have described the passageways J J as being formed by means of the blocks C, D and E, we do not desire to limit it to such construction, because it is apparent to the skilled furnace builder that such passageways may be formed of single pieces with longitudinal openings through them or of a less number of pieces than those shown. We can also make them of other shapes. The advantage of the wedge-shape shown in the drawings is that when the tie-rods V are tightened down, they draw the inclined surfaces of the parts composing the passageways firmly against the reversely inclined surfaces of the abutting parts H H and I, and in this way make a very strong and substantial structure.

It is apparent that the rods V may be anchored to the cave arches or piers or other parts of the under structure, but we prefer to anchor them to the bottom beams as they are more convenient, being accessible in the cave.

The result of our improvement is a strong, durable, permanent bridge, thoroughly cooled, firmly anchored and not liable to be floated or cut by the hot metal, or disrupted by the different degrees of expansion and contraction of the melting and working out chambers.

What we claim as our invention is—

1. A tank for glass melting furnaces having a bridge section between the melting chamber and the working-out chamber, composed of two walls severally supported on the separate unconnected hearths of said chambers and separated from each other by an air chamber, and provided with passages between the melting chamber and the working-out chamber formed by a block or blocks extending through the bridge walls and across the air space; substantially as and for the purposes described.

2. A tank for glass melting furnaces having a bridge anchored to the bottom structure of the furnace by means of suitable anchor plates and tie-rods; substantially as and for the purposes described.

3. The combination of the bridge of a glass melting furnace, with the air chamber K, passages J, anchor plate U and rods V, secured to the bottom structure of the furnace; substantially as and for the purposes described.

4. A tank for glass melting furnaces provided with a bridge composed of an independent section secured by its own buck-staves and tie-rods, independent of the other parts of the structure; substantially as and for the purposes described.

5. In a tank for glass melting furnaces, a bridge composed of two walls, severally supported on the separate unconnected hearths of the melting and working-out chambers and having an intermediate air chamber extending up from the cave of the furnace and opening at the sides, with passages extending from the melting chamber to the working-out chamber through the bridge walls and across the intermediate air chamber, so that the air therein shall have access to the external sides of said walls and passages; substantially as and for the purposes described.

In testimony whereof we have hereunto set our hands this 27th day of February, 1893.

EDWARD H. EVERETT.
ALEXANDER SAMUELSON.

Witnesses:
CHAS. A. WARD,
JOEL M. DENNIS.